US008656449B1

United States Patent
Breau et al.

(10) Patent No.: US 8,656,449 B1
(45) Date of Patent: Feb. 18, 2014

(54) APPLYING POLICY ATTRIBUTES TO EVENTS

(75) Inventors: Jeremy R. Breau, Kansas City, MO (US); Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1704 days.

(21) Appl. No.: 11/830,466

(22) Filed: Jul. 30, 2007

(51) Int. Cl.
*H04L 29/06* (2006.01)

(52) U.S. Cl.
USPC ............... 726/1; 709/220; 709/223; 709/230; 709/238; 709/245

(58) Field of Classification Search
USPC ............................................................ 726/1
See application file for complete search history.

(56) References Cited

U.S. PATENT DOCUMENTS

| | | | | |
|---|---|---|---|---|
| 6,502,131 B1* | 12/2002 | Vaid et al. | ...... | 709/224 |
| 6,968,389 B1* | 11/2005 | Menditto et al. | ...... | 709/233 |
| 7,152,160 B2* | 12/2006 | Lantto et al. | ...... | 713/168 |
| 2002/0093527 A1* | 7/2002 | Sherlock et al. | ...... | 345/736 |
| 2002/0116638 A1* | 8/2002 | Dobes et al. | ...... | 713/201 |
| 2002/0199104 A1* | 12/2002 | Kakemizu et al. | ...... | 713/168 |
| 2003/0055994 A1* | 3/2003 | Herrmann et al. | ...... | 709/229 |
| 2003/0079017 A1* | 4/2003 | Agrawal et al. | ...... | 709/226 |
| 2003/0145225 A1* | 7/2003 | Bruton et al. | ...... | 713/201 |
| 2004/0111643 A1* | 6/2004 | Farmer | ...... | 713/201 |
| 2004/0153545 A1* | 8/2004 | Pandya et al. | ...... | 709/226 |
| 2005/0135375 A1* | 6/2005 | Hurtta et al. | ...... | 370/395.2 |
| 2006/0190602 A1* | 8/2006 | Canali et al. | ...... | 709/226 |
| 2006/0245573 A1* | 11/2006 | Sheth et al. | ...... | 379/221.13 |
| 2007/0168552 A1* | 7/2007 | Alse et al. | ...... | 709/245 |

OTHER PUBLICATIONS

Cohen et al., Proactive Caching of DNS Records: Addressing a Performance Bottleneck, Jan. 2001, Proceedings of the Symposium on Applications and the Internet, pp. 85-94.*

* cited by examiner

*Primary Examiner* — Taghi Arani
*Assistant Examiner* — Kenneth Chang

(57) ABSTRACT

Systems, methods, and computer-readable media, for applying one or more policy attributes to an event are provided. The application of policy attributes to an event is initiated. Thereafter, policy attributes to be applied to an event are identified. Such policy attributes may be identified based on event attributes. The policy attributes are applied to an event so that a specific quality of service is achieved. Subsequently, an indication is provided to reconfigure a host source such that the policy attributes may be applied upon each event request.

6 Claims, 4 Drawing Sheets

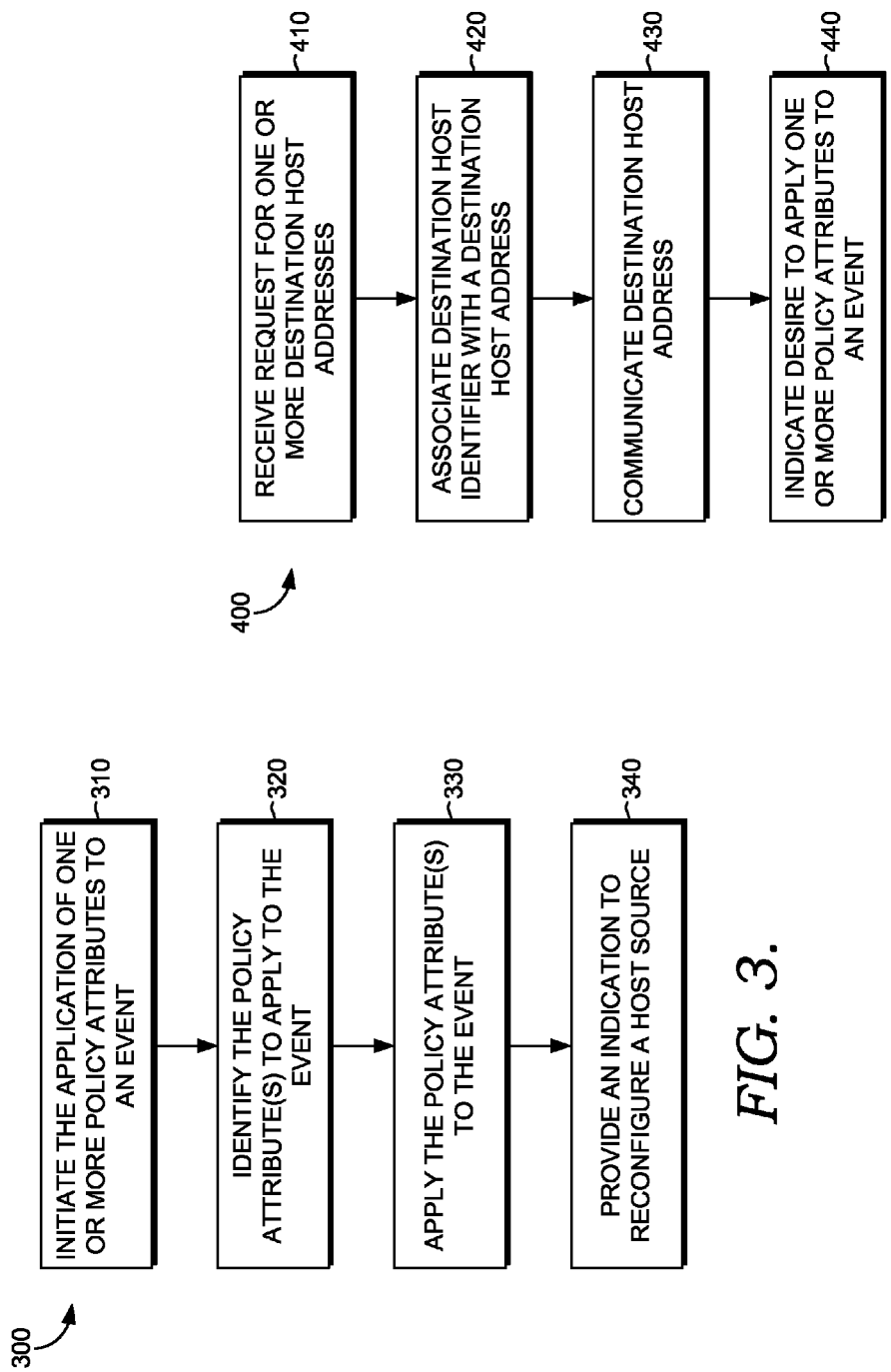

APPLYING POLICY ATTRIBUTES TO EVENTS

BRIEF SUMMARY

This Summary is provided to introduce a selection of concepts in a simplified form that are further described below in the Detailed Description. Embodiments of the present invention are defined by the claims below. This Summary is intended to summarize embodiments of the invention and is not intended to limit the scope of the claims in any way.

In embodiments, one or more computer-readable media having computer-useable instructions embodied thereon for performing a method for initiating the application of one or more policy attributes to an event are provided. A request for destination host addresses associated with a destination host is received. An indication of a desire to apply policy attributes to the event is provided. The indication includes policy attributes that identify the policy attributes to apply to the event.

In other embodiments, one or more computer-readable media having computer-useable instructions embodied thereon for performing a method for identifying one or more policy attributes to apply to an event are provided. The method includes obtaining event attributes and, in response thereto, policy attributes are then identified based on the obtained event attributes. The policy attributes are communicated so that the one or more policy attributes may be applied to an event.

In still further embodiments, a system for applying one or more policy attributes to an event is provided. The system includes an event attribute obtaining component, a policy identifying component, and a policy communicating component. The event attribute obtaining component is configured to obtain one or more event attributes. The policy identifying component is configured to identify policy attributes to apply to the event. The policy attributes are identified based on the one or more event attributes. The policy communicating component is configured to communicate the policy attributes so that the policy attributes may be applied to an event.

BRIEF DESCRIPTION OF THE DRAWINGS

Illustrative embodiments of the present invention are described in detail below with reference to the attached drawing figures, which are incorporated by reference herein and wherein:

FIG. 3 is a flow diagram illustrating an exemplary method for applying one or more policy attributes to an event, in accordance with an embodiment of the present invention;

FIG. 4 is a flow diagram illustrating an exemplary method for initiating the application of one or more policy attributes to an event, in accordance with an embodiment of the present invention.

DETAILED DESCRIPTION

Figure 1:
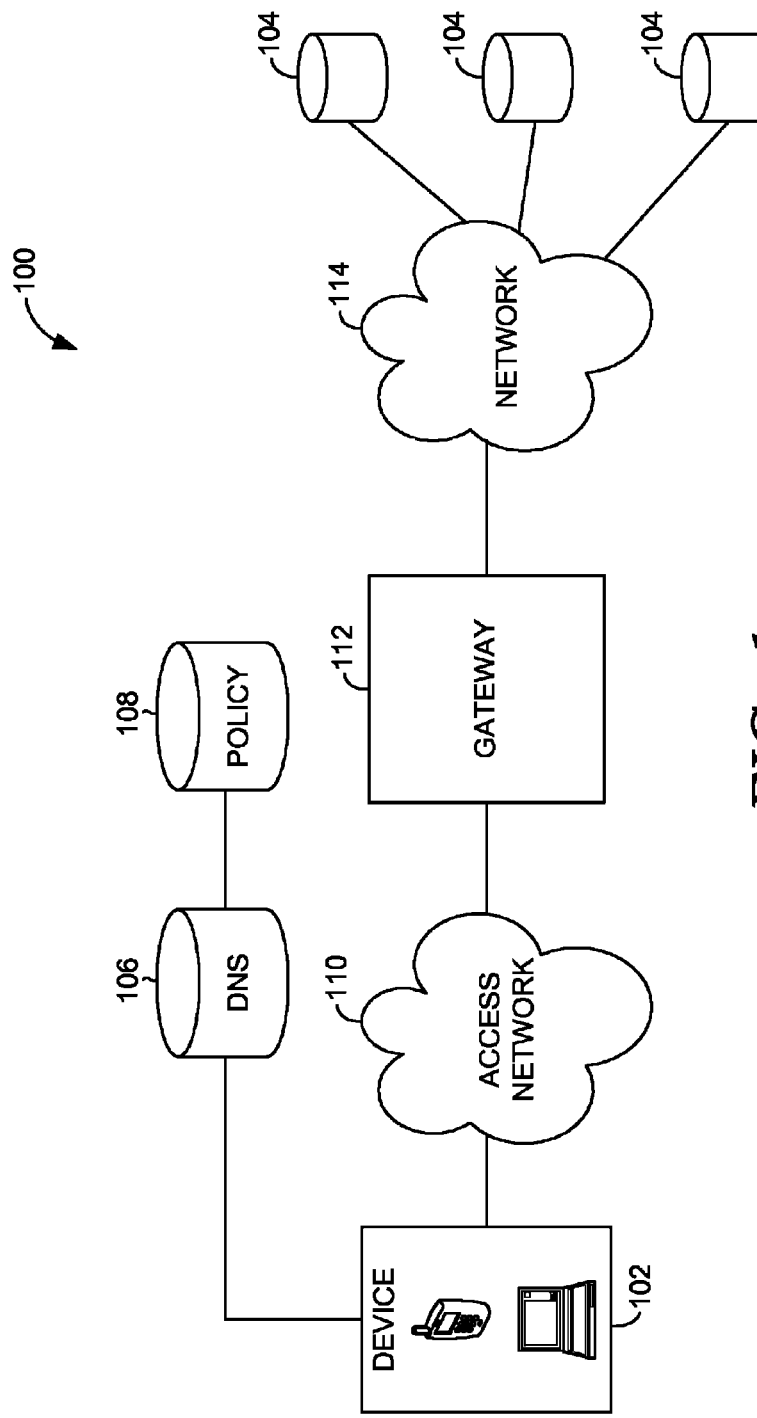
FIG. 1 is a schematic view of an exemplary communications environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for applying one or more policy attributes to an event. Utilizing embodiments hereof, a specific quality of service may be applied to an event desired by a user. As such, a user's experience may be enhanced.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acryonyms:

| | |
|---|---|
| 3G | Third-Generation Wireless Technology |
| 4G | Fourth-Generation Cellular Communication System |
| ASIC | Application Specific Integrated Circuit |
| CD-ROM | Compact Disk Read Only Memory |
| CMTS | Cable Modem Termination System |
| DNS | Domain Name System |
| DVD | Digital Versatile Discs |
| EEPROM | Electrically Erasable Programmable Read Only Memory |
| ENUM | Telephone Number Mapping |
| FAX | Facsimile |
| HA | Home Agent |
| IP | Internet Protocol |
| LAN | Local Area Network |
| PCRF | Policy Charging Resource Function |
| PDA | Personal Digital Assistant |
| PDSN | Packet Data Serving Node |
| RAM | Random Access Memory |
| ROM | Read Only Memory |
| SIP | Session Initiation Protocol |
| TV | Television |
| URL | Uniform Resource Locator |

Further, various technical terms are used throughout this description. To the extent a definition is not provided in this specification, a definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to the drawings in general, and initially to FIG. 1 in particular, an exemplary network environment suitable for use in implementing embodiments of the present invention is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated. In the network environment 100, a device 102 may communicate with a host 104 utilizing a Domain Name Server (DNS) 104 to obtain an Internet Protocol (IP) address of the host 104. The DNS 106 translates host names, e.g., domain names, into host addresses, e.g., IP addresses. The DNS 106 may communicate with a policy server 108 such that a policy, or portion thereof, may be applied to an event, as more fully described below.

The device 102 utilizes an access network 110 to communicate. Access network 110 may include any type of access network, such as cable, wireless, e.g., 3G or 4G, and the like. A gateway 112, such as an IP gateway, is used to allow or control access to another computer network. The device 102 may communicate with one or more networks 114, such as the Internet or an IP-based network. Alternatively or additionally, the network environment 100 may include other network elements for providing device access to network 114. The device 102 communicates with the host 104 via the network 114. One skilled in the art will recognize that any network environment 100 having a network suitable for communicating between a device 102 and a host 104 may be utilized for implementing the present invention.

Figure 2:
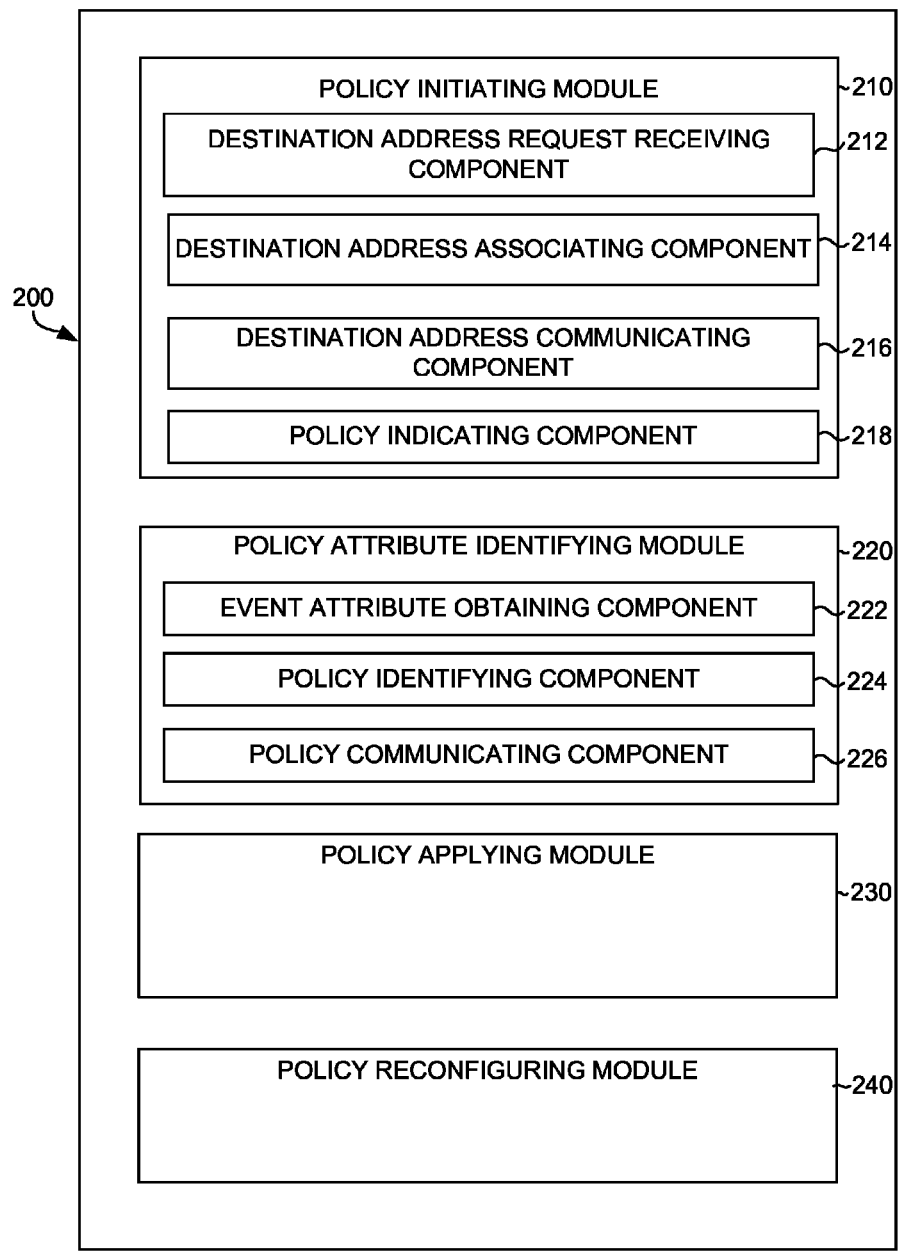
FIG. 2 is a block diagram of an exemplary computer system for applying one or more policy attributes to an event, in accordance with an embodiment of the present invention.

Referring now to FIG. 2, an exemplary computing system 200 for applying one or more policy attributes to an event is illustrated. As utilized herein, the term "policy" refers to one or more policy attributes that indicate the use of resources within a network. The term "policy attribute" may indicate a quality of service for an event. As such, a policy attribute may be associated with a priority, a reliability, a speed, a traffic amount, a throughput, a bandwidth, a transit delay, a jitter, a loss ratio, an error rate, a latency control, or the like. As used herein, the term "event" refers to any type of event including, but not limited to an audio event, e.g., a ring tone download, an audio stream download, and a voice call; a video event, e.g., a clip or video stream download; a data event, e.g., a web page download, a data submission, a search; any other data flow associated with an IP address; and the like. In one embodiment, an event may refer to the all of the data flow between a source host and a destination host in one session. In such a case, a session may end when the data flow between the source host and the destination host ends. For example, assume a user accesses a web page. As such, the event may include the web page download as well as all data flow between the user device and the web page server until the data flow ends. The data flow may end upon the user closing the web browser, accessing a different web page having a different IP address, logging off the computer, and the like. In one embodiment, an event may refer to any non-SIP based event.

As used herein, the term "event attribute" refers to any data pertaining to an event. Event attributes may, for example, pertain to user identifiers, event types, destination hosts, source hosts, event time, event location, any data pertaining thereto, and the like. User identifiers may include any identifier, e.g., values, text, symbols, and the like, that identifies the user. The user may, for example, be identified upon logging on to a device. Event types may refer to various types of events including general events, e.g., audio events, video events, and data events, as well as specific events, e.g., a web page download, for instance, a Sprint® web page download.

A host refers to any computing device that has two-way access to other computing devices on a network, such as the Internet, LAN, any IP-based network, or other public packet data network. Computing devices may include any device that performs one or more computing functions including, but not limited to, mobile phones; personal digital assistants (PDA); televisions (TVs); laptops; desktop computers; facsimile (FAX) machines; digital versatile disc (DVD) players; servers, e.g., web servers; or any other computing device. A destination host refers to a host, having at least one destination address, with which a source host desires to communicate. For example, assuming a user desires to access a Sprint® web page, Sprint® may be the destination host. As such, an event attribute pertaining to a destination host may include a Sprint identifier, such as a Sprint® trademark, a name associated with Sprint®, a number associated with Sprint®, a Sprint® IP address, a Sprint® domain name (e.g., www.sprint.com), and the like. A source host may refer to a host that initiates communication with a destination host. The event time may refer to the time of the event request, the expected event duration, and the like. The event location may refer to the location of the event requesting device, the location of the event provider, and the like.

A policy, or portion thereof, may be associated with one or more event attributes. In one embodiment, a policy may be based on a user or a group of users, e.g., source host. For example, a policy may apply to a user or a group of users, such as a high priority user group (e.g., a group that utilizes more services). Such a policy may include various portions, i.e., policy portions, that apply to specific events, such as video downloading, audio downloading, and website downloading. Accordingly, one policy portion having a set of policy attributes may be applied in an instance where a user downloads a web page while another policy portion having a set of policy attributes may be applied in an instance where the user downloads a video. In another embodiment, a policy may be based on a destination host. For example, a policy may apply to any user that initiates communication with a specific website. One skilled in the art will recognize that a policy, policy portion, and/or policy attributes may be associated with any combination of users, event types, destination host, source host, event time, event location, and the like, in accordance with embodiments hereof.

As shown in FIG. 2, an exemplary computing system 200 for applying one or more policy attributes to an event includes a policy initiating module 210, a policy attribute identifying module 220, a policy applying module 230, and a policy reconfiguring module 240. In some embodiments, one or more of the illustrated modules and/or components may be implemented as one or more stand-alone applications. In other embodiments, one or more of the illustrated modules and/or components may be integrated directly into an operating system or an application of a server and/or an end-user device, such as a mobile telephone or other computing device. It will be understood by those of ordinary skill in the art that the modules and/or components illustrated in FIG. 2 are exemplary in nature and in number and should not be construed as limited. Any number of modules and/or components may be employed to achieve the desired functionality within the scope of embodiments hereof. Further, modules and/or components may be located on any number of servers or computing devices.

The policy initiating module 210 is configured to initiate the application of one or more policy attributes to an event. To initiate the application of one or more policy attributes to an event, the policy initiating module 210 may provide an indication of a desire to apply one or more policy attributes to the event. Such an indication may be, for instance, a policy request for a specific event. In one embodiment, the policy initiating module 210 resides on one or more servers utilized to associate a host identifier with a host address. Such servers may include a domain name system (DNS), a telephone number mapping server (ENUM), or the like. One skilled in the art will recognize that policy initiating module 210, or components thereof, may reside within other computing devices, such as the source host, in accordance with embodiments hereof.

A host identifier may be any type of identifier, e.g., a value, text, a symbol, and the like, that is associated with a host, or portion thereof, and may be translated into or associated with a host address, such as an IP address. A host identifier may include a host name or a host number. A host name may refer to, for example, a domain name, a uniform resource locator (URL), and email address, and the like. A host number may refer to, for example, a phone number and the like. A host address refers to an address, such as an IP address, associated with a host, or portion thereof, that allows the host to communicate with other hosts. A host attribute may be any type of attribute (e.g., a value, text, a symbol, and the like) that is associated with a host, or portion thereof, and may be translated into or associated with a host address, such as an IP address.

In embodiments, the policy initiating module 210 may include a destination address request receiving component 212, a destination address associating component 214, a destination address communicating component 216, and a policy indicating component 218. The destination address request receiving component 212 is configured to receive one or more requests for destination addresses associated with a destination host. A destination host address request may refer to a request for a destination host address. A destination address refers to an address, such as an IP address, associated with a destination host that allows the destination host to communicate with other hosts. An IP address may refer to a numeric address having four number sets separated by dots, e.g., 1.123.12.123.

A source host, e.g., a mobile phone, or a portion thereof, may communicate the one or more requests such that the destination address request receiving component 212 may receive the requests. The requests received by destination address request receiving component 212 may include destination host identifiers, source host identifiers, source host addresses, user identifiers, and the like to indicate the desired destination and/or source.

The destination address associating component 214 may be configured to associate one or more destination addresses with a destination host identifier, such as a host identifier received by destination address request receiving component 212. The destination address associating component 214 may utilize an algorithm and/or a lookup system to associate one or more destination addresses with a host identifier. Where the destination address associating component 214 resides on a DNS or ENUM server, the destination address associating component 214 may utilize databases stored therewith that include IP addresses mapped to corresponding host names, e.g., domain names.

The destination address communicating component 216 is configured to communicate at least a portion of the one or more destination addresses associated with a host attribute. Such a communication may provide a source host, e.g., a mobile device with one or more destination addresses so that the source host may communicate with the destination host.

The policy indicating component 218 is configured to indicate that the application of one or more policy attributes to an event is desired. In one embodiment, the indication may be a request to apply a policy, or portion thereof, to an event. Such a request may be communicated to, for example, a policy attribute identifying module 220. The request may include one or more event attributes, e.g., a source IP address or a destination IP address, so that one or more policy attributes may be identified and applied to an event. The indication may be provided automatically or upon receiving an indication, for example, from a user.

The policy attribute identifying module 220 is configured to identify one or more policy attributes to apply to an event. A policy attribute identifying module 220 may reside on, for example, a policy server, e.g., PCRF. A policy server may include one or more policies. In embodiments, the policy attribute identifying module 220 includes an event attribute obtaining component 222, a policy identifying component 224, and a policy communicating component 226.

The event attribute obtaining component 222 is configured to obtain one or more event attributes. The event attribute obtaining component 222 may obtain one or more event attributes by, for instance, receiving, retrieving, generating, or identifying the event attributes. Such event attributes may include, for example, a source IP address and a destination IP address. In an embodiment where the event attributes are received or retrieved, the event attributes may be received or retrieved from, for example, a policy initiating module, such as a policy initiating module 210 residing on one or more servers, e.g., DNS or ENUM, utilized to associate a host identifier, e.g., domain name, with a host address, e.g., IP address. In such a case, the event attributes may be received as part of a request to initiate the application of a policy to an event. One skilled in the art will also recognize that event attribute obtaining component 222 may receive or retrieve event attributes from a source host.

The policy identifying component 224 is configured to identify one or more policy attributes to apply to an event. The policy attributes to apply to an event may be identified based on one or more event attributes, such as event attributes obtained by event attribute obtaining module 222. The policy identifying component 224 may utilize an algorithm, a lookup table, or a combination thereof to identify one or more policy attributes to apply to an event. For example, assume that along with a request to apply a policy, event attributes that indicate the source IP address and the destination IP address are also received by policy attribute identifying module 220. In such a case, policy identifying component 224 may utilized the source IP address and the destination IP address to identify applicable policy attributes. As such, where a policy is based on the user device, the source IP address may be used to locate the policy attributes that correspond with the source IP address and, thereby, the user device. In one embodiment, the policy identifying component 224 may utilize a customer profile server to identify one or more policy attributes to apply to an event.

The policy communicating component 226 is configured to communicate the one or more policy attributes such that the policy attributes may be applied to an event. In one embodiment, the policy communicating component 226 may communicate the policy attributes to a policy applying module 230. One skilled in the art will appreciate that the policy attributes may also, or alternatively, be communicated to a DNS server, or the like.

The policy applying module 230 is configured to apply one or more policy attributes to the event. Such an application of a policy, or portion thereof, to an event may occur within one or more gateways, such as IP gateways. Accordingly, the policy applying module 230 may reside within one or more gateways. A gateway is used to allow or control access to another computer network. Gateways may include, for example, cable modem termination system (CMTS), home agent (HA), packet data serving node (PDSN), and the like. Such an application of one or more policy attributes to an event provides a quality of service, as indicated by the policy attributes, to be applied to an event, e.g., all data flow between the host source and the destination source within one session.

The policy applying module 230 may obtain the one or more policy attributes to be applied to the event by receiving, retrieving, generating, or identifying the policy attributes. In an embodiment where the policy attributes are received or retrieved, the policy attributes may be received or retrieved from a policy server, a DNS server, an ENUM server, a source host, or the like.

The policy reconfiguring module 240 is configured to provide an indication to reconfigure a host source such that one or more policy attributes may be applied upon each event request. Because a source host may store destination addresses within the host source, e.g., cache the destination address, a policy reconfiguring module 240 may be utilized to remove destination addresses from the cache such that one or more policy attributes may be applied each time an event is requested by the host source.

In one embodiment, such a policy reconfiguring module 240 may reside on one or more gateways, e.g., IP gateways. In such an embodiment, the policy reconfiguring module 240 may be configured to determine when the data flow ends, remove the quality of service applied to the data flow, and provide an indication to the source host to remove destination addresses from the cache. In another embodiment, the policy reconfiguring module 240 may reside within the source host. In such an embodiment, an algorithm or setting may be utilized that indicates the time or time duration after which to remove the destination addresses from the cache. For example, a mobile device may have a setting that the destination addresses should be removed from the cache every five seconds. In yet another embodiment, the policy reconfiguring module 240 may reside within a DNS server, ENUM server, or the like. In such an embodiment, the policy reconfiguring module 240 may provide an indication to remove the destination address from the cache.

With reference to FIG. 3, a flow diagram is shown illustrating a method 300 for applying one or more policy attributes to an event, in accordance with an embodiment of the present invention. Initially, as indicated at block 310, the application of one or more policy attributes to an event is initiated. For example, a DNS may communicate a request to apply one or more policy attributes to an event. Such a request may include one or more event attributes. Subsequently, as indicated at block 320, one or more policy attributes to be applied to an event are identified. For example, a policy server may identify policy attributes to apply to an event. Such policy attributes may be identified, for example, based on event attributes. The one or more policy attributes are applied to an event, as indicated at block 330. By way of example only, IP gateways may apply such policy attributes to achieve a specific quality of service. As indicated at block 340, the indication is then provided to reconfigure a host source such that one or more policy attributes may be applied upon each event request. For example, the IP gateways may determine that the data flow has ended and may provide the source host with an indication to remove the destination addresses.

Referring now to FIG. 4, a flow diagram is shown illustrating a method 400 for initiating the application of one or more policy attributes to an event, in accordance with an embodiment of the present invention. Initially, as indicated at block 410, a request for one or more destination host addresses is received. Thereafter, as indicated at block 420, a destination host identifier is associated with a destination host address. Such a destination host identifier, e.g., domain name, may be included in the request for the one or more destination host addresses. The destination host address is communicated, as indicated at block 430, so that communication may be established between the source host and the destination host. As indicated at block 440, a desire to apply one or more policy attributes to an event is indicated.

Figure 5:
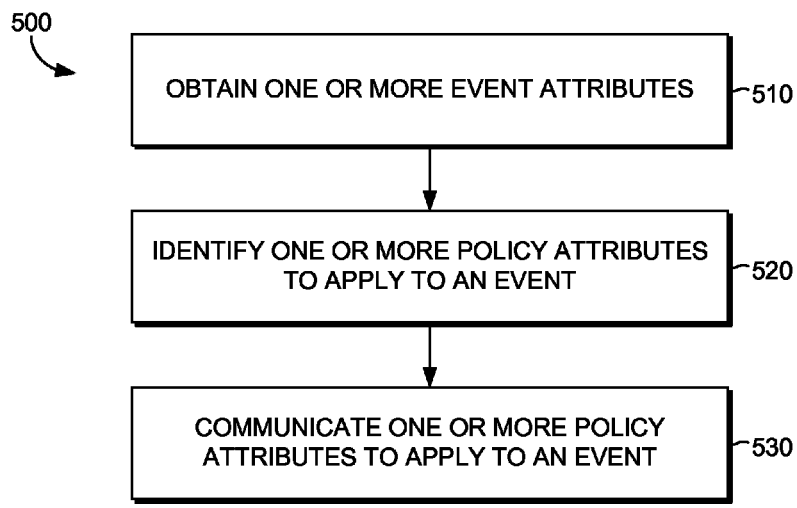
FIG. 5 is a flow diagram illustrating an exemplary method for identifying one or more policy attributes to apply to an event, in accordance with an embodiment of the present invention.

With reference to FIG. 5, a flow diagram is shown illustrating a method 500 for identifying one or more policy attributes to apply to an event, in accordance with an embodiment of the present invention. Initially, as indicated at block 510, one or more event attributes are obtained. Subsequently, one or more policy attributes to be applied to an event are identified, as indicated at block 520. The one or more policy attributes may be identified based on the event attribute(s) obtained at block 510. As indicated at block 530, the policy attribute(s) to be applied to the event are communicated so that the policy attributes may be applied and a quality of service may be recognized.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. One or more non-transitory computer-readable storage media having computer-executable instructions embodied thereon that, when executed, perform a method for initiating application of policy attributes to events, the method comprising:
receiving a first request, from a user device, for at least one host address associated with a destination host, the first request being received by a component that associates destination hosts with host addresses comprising internet protocol (IP) addresses;
in response to receiving the first request,
(1) identifying a destination address associated with the destination host,
(2) providing the destination address to the user device, and
(3) initiating an application of a first policy attribute to a first event via the component providing an indication to apply the first policy attribute associated with the first event;
receiving, at the component, a second request from the user device for the at least one host address associated with the destination host, wherein the second request is communicated from the user device based on the destination address being removed from the cache of the user device; and
in response to receiving the second request, initiating an application of a second policy attribute to a second event via the component providing an indication to apply the second policy attribute associated with the second event;
wherein the first policy attribute comprises a priority, a reliability, a speed, a traffic amount, a throughput, a bandwidth, a transit delay, a jitter, a loss ratio, an error rate, a latency control, or a combination thereof;
wherein a telephone number mapping server receives the request for the at least one destination host address and provides the indication to apply the first policy attribute to the event.

2. The media of claim 1, wherein a domain name system receives the request for the at least one destination host address and provides the indication to apply the first policy attribute to the event.

3. The media of claim 1, wherein the first event comprises an audio event, a video event, a data event, or a combination thereof.

4. One or more non-transitory computer-readable storage media having computer-executable instructions embodied thereon that, when executed, perform a method for identifying policy attributes to apply to events, the method comprising:
obtaining one or more event attributes;
identifying one or more policy attributes to apply to an event associated with a mobile device and a destination host, wherein the one or more policy attributes are identified based on the one or more event attributes;
communicating the one or more policy attributes to one or more gateways so that the one or more policy attributes are applied by the one or more gateways to the event; and
providing an indication to the mobile device to remove one or more destination addresses corresponding with the destination host from a cache of the mobile device so that the one or more policy attributes are applied upon another request by the mobile device for another event associated with the destination host;
wherein at least one of the one or more event attributes comprises a user identifier, an event type, a destination host, a source host, an event time, an event location, or a combination thereof;
wherein at least one of the one or more policy attributes comprises an indication of the use of resources within a network or an indication of a quality of service associated with the event.

5. The media of claim 4, wherein at least one of the one or more event attributes comprises any data pertaining to the event.

6. A system for applying policy attributes to events, the system comprising:
a processor;
a memory storing:
a domain name component that receives a request for a host address associated with a destination host to which a user device intends to communicate and, in response to reception of the request for the host address,
(1) associates the destination host with a destination address corresponding with the destination host,
(2) communicates the destination address to the user device, and
(3) provides an indication to apply a policy attribute to a first event occurring between the user device and the destination host;
a policy component that
(1) receives the indication to apply the policy attribute to the first event,
(2) identifies a first policy attribute to apply to the first event, and
(3) communicates the first policy attribute to apply to the first event; and
a gateway component that
(1) receives the first policy attribute to apply to the first event,
(2) applies the first policy attribute to the first event to attain a quality of service for the first event, and
(3) upon completion of the first event, provide an indication to the user device to remove the destination address from a cache of the user device so that one or more appropriate policy attributes are identified and applied for a second event associated with the same destination host as the first event;
wherein the first policy attribute comprises a priority, a reliability, a speed, a traffic amount, a throughput, a bandwidth, a transit delay, a litter, a loss ratio, an error rate, a latency control, or a combination thereof;
wherein the first event comprises an audio event, a video event, a data event, or a combination thereof;
wherein the processor executes the domain name component, the policy component, and the gateway component.

* * * * *